US009748616B2

(12) United States Patent
Deb

(10) Patent No.: US 9,748,616 B2
(45) Date of Patent: Aug. 29, 2017

(54) REGENERATION OF CATHODE MATERIAL OF LITHIUM-ION BATTERIES

(71) Applicant: UNIVERSITY OF CALCUTTA, West Bengal (IN)

(72) Inventor: Nilanjan Deb, Kolkata (IN)

(73) Assignee: University of Calcutta, Kolkata, West Bengal (IN)

( * ) Notice: Subject to any disclaimer, the term of this patent is extended or adjusted under 35 U.S.C. 154(b) by 406 days.

(21) Appl. No.: 14/464,420

(22) Filed: Aug. 20, 2014

(65) Prior Publication Data

US 2015/0052739 A1 Feb. 26, 2015

(30) Foreign Application Priority Data

Aug. 20, 2013 (IN) .............................. 962/KOL/2013

(51) Int. Cl.
| | | |
|---|---|---|
| H01M 10/00 | (2006.01) |
| H01M 10/54 | (2006.01) |
| C01G 51/00 | (2006.01) |
| H01M 4/525 | (2010.01) |
| C01G 45/12 | (2006.01) |
| C01G 51/04 | (2006.01) |
| C01G 51/08 | (2006.01) |
| C01G 53/00 | (2006.01) |
| C01D 15/04 | (2006.01) |
| C22B 26/12 | (2006.01) |
| C22B 7/00 | (2006.01) |

(52) U.S. Cl.
CPC ............ *H01M 10/54* (2013.01); *C01D 15/04* (2013.01); *C01G 45/1221* (2013.01); *C01G 51/04* (2013.01); *C01G 51/085* (2013.01); *C01G 51/42* (2013.01); *C01G 53/42* (2013.01); *C22B 7/00* (2013.01); *C22B 26/12* (2013.01); *H01M 4/525* (2013.01); *C01P 2002/72* (2013.01); *C01P 2002/82* (2013.01); *C01P 2006/40* (2013.01); *Y02P 10/212* (2015.11); *Y02W 30/84* (2015.05); *Y10T 29/49115* (2015.01)

(58) Field of Classification Search
CPC .............. H01M 10/54; H01M 10/0525; C01G 51/42–51/64; C01G 53/42–53/64; C01G 45/1221; C01G 45/1257
USPC ........... 423/179.5, 594.4, 594.6, 599; 429/49
See application file for complete search history.

(56) References Cited

U.S. PATENT DOCUMENTS

2007/0196725 A1 8/2007 Tedjar et al.

FOREIGN PATENT DOCUMENTS

| CN | 101186344 A | 5/2008 |
| CN | 101509071 A | 8/2009 |
| CN | 101673859 A | 3/2010 |
| CN | 101942569 A | 1/2011 |

(Continued)

OTHER PUBLICATIONS

Search Report issued in Chinese counterpart application No. CN 201410410702.7A dated Feb. 23, 2016.

(Continued)

*Primary Examiner* — Steven Bos
(74) *Attorney, Agent, or Firm* — Pepper Hamilton LLP

(57) ABSTRACT

Lithium metal oxides may be regenerated under ambient conditions from materials recovered from partially or fully depleted lithium-ion batteries. Recovered lithium and metal materials may be reduced to nanoparticles and recombined to produce regenerated lithium metal oxides. The regenerated lithium metal oxides may be used to produce rechargeable lithium ion batteries.

20 Claims, 7 Drawing Sheets

(56) References Cited

FOREIGN PATENT DOCUMENTS

| | | |
|---|---|---|
| CN | 102163760 A | 8/2011 |
| WO | 0223651 A1 | 3/2002 |

OTHER PUBLICATIONS

Ekermo, Recycling opportunities for Li-ion batteries from hybrid electric vehicles, Master of Science Thesis in Chemical Engineering, Department of Chemical and Biological Engineering, Chalmers University of Technology, Goteborg, Sweden (2009, pp. 1-47.

Espinosa, D. C. R. et al., "An overview on the current processes for the recycling of batteries," Journal of Power Sources, vol. 135, No. 1-2, pp. 311-319 (2004).

Ferreira, D. A., et al., "Hydrometallurgical separation of aluminium, cobalt, copper and lithium from spent Li-ion batteries," Journal of Power Sources, vol. 187, No. 1, pp. 238-246 (2009).

Gaines, L., & Cuenca, R., "Costs of Lithium-Ion Batteries for Vehicles," United States Department of Energy, Center for Transportation Research: EnergySystems Division, Argonne National Laboratory, Argonne, pp. 73 (2000).

Gu, F. et al., "Preparation of LiCoO2 from Cathode Materials of Spent Lithium Ion Batteries," Advanced Materials Research, vol. 183-185, pp. 1553-1557 (2011).

Huang, B. et al., "Electrochemical evaluation of LiCoO2 synthesized by decomposition and intercalation of hydroxides for lithium-ion battery applications," Journal of applied Electrochemistry, vol. 28, pp. 1365-1369 (1998).

Jiangang, L. et al., "Preparation of LiCoO2 cathode materials from spent lithium-ion batteries," Ionics, vol. 15, No. 1, pp. 111-113 (2009).

Lee, C.K. and Rhee, K-I., "Preparation of LiCoO2 from spent lithium-ion batteries," Journal of Power Sources, vol. 109, No. 1, pp. 17-21 (2002).

Li, J-G. et al., "Preparation of LiNi1/3Co1/3Mn1/3O2 cathode materials from spent Li-ion batteries," Trans. Nonferrous Met. Soc., vol. 17, pp. s897-s901 (2007).

Li, L. et al., "Preparation and electrochemical properties of re-synthesized LiCoO2 from spent lithium-ion batteries," Chinese Science Bulletin, vol. 57, No. 32, pp. 4188-4194 (2012).

Li, L. et al., "Regeneration of Cathode Material LiCoO_2 from Spent Lithium-Ion Batteries and Its Electrochemical Properties," pp. 2, (2011).

Lupi, C. et al., "Nickel and cobalt recycling from lithium-ion batteries by electrochemical processes," Waste management, vol. 25, No. 2 pp. 215-220 (2005).

Meza, E. et al., "Lithium Cobalt spinel oxide: A structural and electrochemical study," J. Chil. Chem. Soc, vol. 53, No. 2, pp. 1494-1497 (2008).

Paulino, J. F. et al., "Recovery of valuable elements from spent Li-batteries," Journal of Hazardous Materials, vol. 150, No. 3, pp. 843-849 (2008).

Predoană, L. et al., "Advanced Techniques for LiCoO2 Preparation and Testing," Proceedings of the International Workshop, Sep. 4-9, 2004, pp. P4-1-P4-8.

Prosini, P. P., et al., "Lithium iron oxide as alternative anode for li-ion batteries," International Journal of Inorganic Materials, vol. 2, No. 4, pp. 365-370 (2000).

Xu, J. et al. "A review of processes and technologies for the recycling of lithium-ion secondary batteries," Journal of Power Sources, vol. 177, No. 2, pp. 512-527 (2008).

US 9,748,616 B2

REGENERATION OF CATHODE MATERIAL OF LITHIUM-ION BATTERIES

RELATED APPLICATION

This application claims priority benefit under Title 35 §119(a) of Indian Patent Application No. 962/KOL/2013, filed Aug. 20, 2013, entitled, "Regeneration of Cathode Material of Lithium-Ion Batteries," the contents of which are herein incorporated by reference.

BACKGROUND

Due to the high energy intensity, light weight, and long service life, lithium-ion (Li-ion) batteries have become one of the most popular types of rechargeable batteries for portable electronic devices, military, electric vehicle and aerospace applications.

Of the various lithium-ion battery types, $LiCoO_2$ is the most widely used cathode material for commercial batteries. However, spent Li-ion batteries with this cathode material are a concern for wastage of precious metals, while disposal may cause pollution. Recycling of $LiCoO_2$ cathode materials from spent lithium-ion batteries is therefore desirable, including the separation and regeneration of $LiCoO_2$ cathode materials. The current processes involving separation of the elements into different fractions are not effective in terms of cost and energy requirements.

SUMMARY

Lithium metal oxides may be regenerated under ambient conditions from materials recovered from partially or fully depleted lithium-ion batteries.

In an embodiment, a method for regenerating a cathode material from a partially or fully depleted lithium-ion battery may include recovering lithium metal oxide from the lithium-ion battery, and converting at least a portion of the lithium metal oxide to lithium halide and a metal oxide. The lithium halide and the metal oxide may be reduced to respective nano-particles, and the lithium nano-particles may be combined with the metal nano-particles in the presence of oxygen to produce regenerated lithium metal oxide.

In an embodiment, a method for regenerating and reusing cathode material from a partially or fully depleted lithium-ion battery may include recovering lithium metal oxide from the battery, converting at least a portion of the lithium metal oxide to lithium halide and a metal oxide, reducing the lithium halide and the metal oxide to respective nano-particles, and combining the lithium nano-particles with the metal nano-particles in the presence of oxygen to produce regenerated lithium metal oxide. A metal foil may be coated with the regenerated lithium metal oxide, the coated metal foil may be layered with separator sheets and an anode sheet to produce a stacked electrode structure, and the stacked electrode structure may be contacted with an electrolyte solution to produce a lithium-ion battery.

In an embodiment, a method for producing lithium metal oxides may include forming a mixture of at least one lithium halide and at least one metal oxide, reducing the lithium halide and the metal oxide to respective nano-particles, and combining the lithium nano-particles with the metal nano-particles in the presence of oxygen to produce regenerated lithium metal oxide.

BRIEF DESCRIPTION OF THE FIGURES

FIG. 3A is a HR XRD of regenerated $LiCoO_2$. FIG. 3B is a XRD of $LiCoO_2$ from other sources at 300° C., 500° C., and 700° C.

FIG. 4A is an FTIR of regenerated $LiCoO_2$. FIG. 4B is an FTIR of $LiCoO_2$ from other sources.

FIG. 5A is a $LiCoO_2$ peak in the oxidation process of a cyclic voltammeter in DMSO at a scanning rate of 100 mV/s. FIG. 5B is a $LiCoO_2$ peak in the reduction process of a cyclic voltammeter in DMSO at a scanning rate of 100 mV/s. FIG. 5C is a cyclic voltammogram of regenerated $LiCoO_2$ in acetonitrile at a scanning rate of 100 mV/s. FIG. 5D is a cyclic voltammogram of regenerated $LiCoO_2$ in acetonitrile at a scanning rate of 100 mV/s.

DETAILED DESCRIPTION

Figure 1:
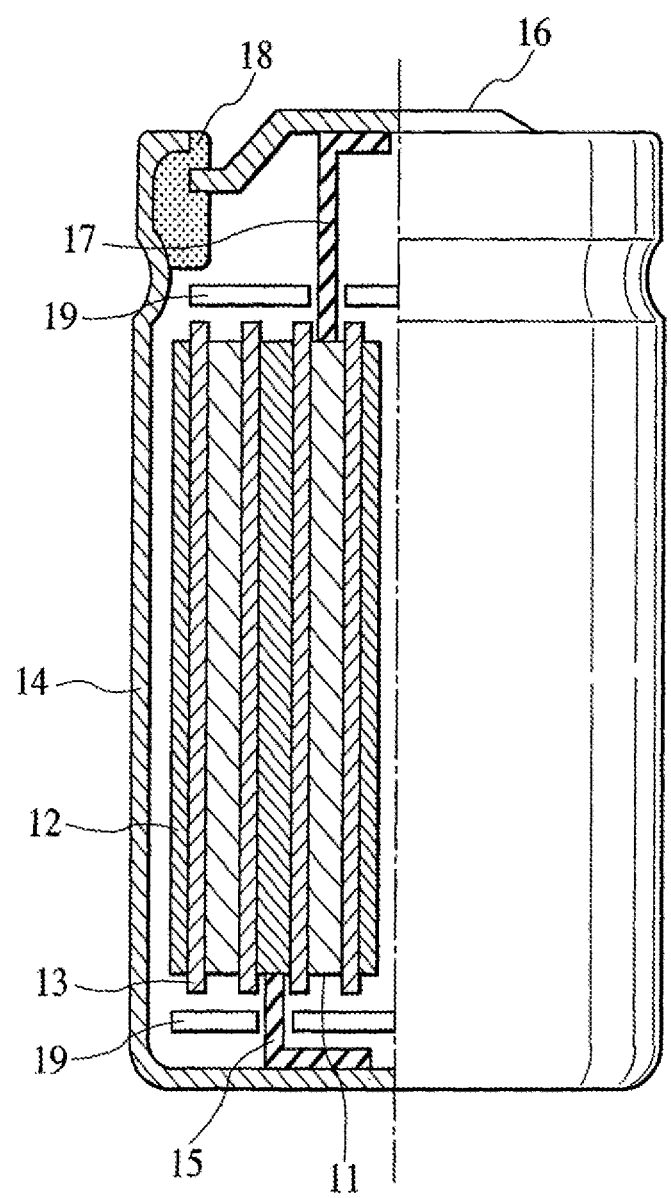
FIG. 1 depicts a representation of a lithium-ion battery according to an embodiment.

A representation of a cylindrical lithium-ion battery 10 is schematically depicted in FIG. 1. A lithium-ion (Li-ion) battery may include a cathode active material that is a composite of lithium and a transition metal such as manganese (Mn), cobalt (Co) or nickel (Ni) for a cathode plate 11, and a lithium intercalating anode active material of carbon, such as graphite or amorphous carbon, for an anode plate 12. The cathode plate 11 and the anode plate 12 may be stacked together with a separator material 13 disposed therebetween so that the cathode plate and anode plate are not in direct physical contact with each other. The separator material 13 may be, for example, a finely porous insulating material that may, for example, be a resin such as polyethylene (PE) or polypropylene (PP), a laminate thereof, or inorganic compounds such as alumina in the dispersed form. A separator film may have a thickness of, for example, about 15 µm to about 50 µm.

In an embodiment, a cathode plate 11 may be prepared as described below. A cathode active material for Li-ion batteries may, in general, be a lithium metal oxide represented by the formula $Li_xMo_y$, where M is one or more transition metals each having a stable formal oxidation state of +2 or +3, and $(x+3-z)/2 \leq y \leq (x+3+z)/2$, where z is 0, 1 or 2. In an embodiment, M may be Mn, Co or Ni. As mentioned above, a commonly used lithium metal oxide is $LiCoO_2$. A powder of the cathode active material and a conductive agent may be mixed thoroughly. As examples, the conductive agent may be graphite type or amorphous carbon powder. In an embodiment, the conductive agent may be about 7 wt % to about 25 wt % of the cathode active material. A solution of a binder, such as polyethylene glycol (PEG) or polyvinylidene fluoride (PVDF), for example, in a solvent, such as N-methylpyrrolidone (NMP), may be added to the above mixture, and the components may be mixed together to form a slurry. The polymer binder may be any binder generally used in Li-ion batteries. Another example may include hexafluoropropylene (HFP).

In an embodiment, the slurry may be coated on a first side of a foil, such as an aluminum foil having a thickness of about 10 µm to about 20 µm, and dried at an elevated temperature, such as about 80° C. to about 100° C. Using the same procedure, the slurry may be coated on the second side of the foil and dried. Subsequently, the coated foil may be compression molded by a roll press, and cut into a predetermined size to prepare the cathode plate 11. In an embodiment, the foils may be cut prior to coating.

In an embodiment, an anode plate 12 may be prepared as described below. An anode active material for Li-ion batteries may, in general, be a metal, for example, lithium, carbon, or a material capable of intercalating lithium or forming a compound. Carbon materials may include, for example, graphitic material or amorphous carbon material. The material capable of intercalating lithium or forming a compound may include, for example, metals such as aluminum, tin, silicon, indium, gallium, and magnesium, alloys containing such elements, metal oxides such as of tin and silicon, composite materials of the metal, alloy or metal oxide, and a graphitic or amorphous carbon material.

In an embodiment, a carbon material may be used for the anode active material. A solution of a binder, such as PVDF, for example, may be dissolved into a solvent, such as NMP, for example, and the anode active material may be added to form a slurry. The slurry may be coated on a first side of a foil, such as copper foil, for example, and dried at an elevated temperature, for example, about 80° C. to about 100° C. Using the same procedures, the slurry may be coated on the second surface of the foil and dried. Subsequently, the coated foil may be compression molded by a roll press and cut into a predetermined size to prepare the anode plate 12.

Coated foils may be directly fed into a drying oven to bake the electrode material onto the foil. The coated foils may subsequently be fed into slitting machines to cut the foil into narrower strips suitable for different sizes of electrodes. As mentioned above, the foils may also be cut into appropriately dimensioned strips prior to coating.

In a cylindrical battery 10 as shown, the stacked layers (long strips of anode and cathode plates separated by separator sheets) may be wound on a mandrel and rolled together to form a spirally wound cylindrical shape. In alternate variants, the stacked layers may be folded to provide a rectangular shape, or a plurality of sheets may simply be stacked in alternating layers of cathode plates 11 and anode plates 12. Prismatic cells are often used for high capacity battery applications to optimize the space. These designs use a stacked electrode structure in which the anode and cathode foils are cut into individual electrode plates which are stacked alternately and kept apart by the separator. The separator may be cut to the same size as the electrodes but may also be applied in a long strip wound in a zigzag fashion between alternate electrodes in the stack. Prismatic cell designs are generally considered to provide the optimum use of space for battery packs.

To form an electrode group, at least one electrical lead 15 may be attached to the anode plate 12, and at least one electrical lead 17 may be attached to the cathode plate 11. For cylindrical cells, since only one continuous cathode and one continuous anode are used, only two electrode strips are needed. The electrode group may be inserted into a container, such as a battery can 14 with the negative lead 15 attached to the bottom of the can, and the positive lead 17 attached to a sealing lid 16. The sealing lid 16 may be separated from the can 14 by a packing 18. An insulating plate 19 may also be provided to isolate the edges of the plates 11, 12 from the can 14 and sealing lid 16.

A non-aqueous electrolyte having lithium ions for electrochemically bonding with the cathode and anode may be provided in the battery can 14 to surround the plates 11, 12. The electrolyte wets the separator and electrodes and is distributed more or less throughout the layers.

The non-aqueous electrolyte may be formed by dissolving a lithium salt in a non-aqueous solvent. The lithium salt supplies lithium ions to move in the electrolyte upon charging/discharging of the battery. Some examples of lithium salts may include $LiClO_4$, $LiCF_3SO_3$, $LiPF_6$, $LiBF_4$, $LiAsF_6$, and similar salts, and combinations thereof. Some examples of organic solvents may include, carbonates, esters and ethers including, for example, ethylene carbonate, propylene carbonate, butylene carbonate, dimethyl carbonate, diethyl carbonate, methyl ethyl carbonate, diethyl carbonate, γ-butyrolactone, and similar solvents, and combinations thereof. Various additives may also be added to the electrolyte solution, as necessary, for example, with an aim of suppressing side reactions of the battery and improving the stability. The additives may include, for example, sulfur type compounds, phosphorus type compounds, those dissolved in the solvent and those serving also as the solvent.

During charging, lithium ions are de-intercalated from the cathode active material of cathode plate 11 into the non-aqueous electrolyte, and lithium ions corresponding to the amount of the de-intercalated lithium ions are intercalated from the non-aqueous electrolyte to the anode active material of anode plate 12. During discharging, lithium ions intercalated by charging to the anode active material are de-intercalated into the non-aqueous electrolyte and intercalated in the cathode active material.

The traversing of lithium ions across the electrolytic materials in a lithium-ion battery, to and from the positive electrode material, induces disorder in the crystalline structure of the positive electrode. This disorder induces impurities in the crystalline structure of the positive electrode, changing the structure of the crystal, and thus, the function. The induced structures imposed by charging/discharging cycles of the battery eventually render the battery useless for its intended purpose.

Figure 2A:
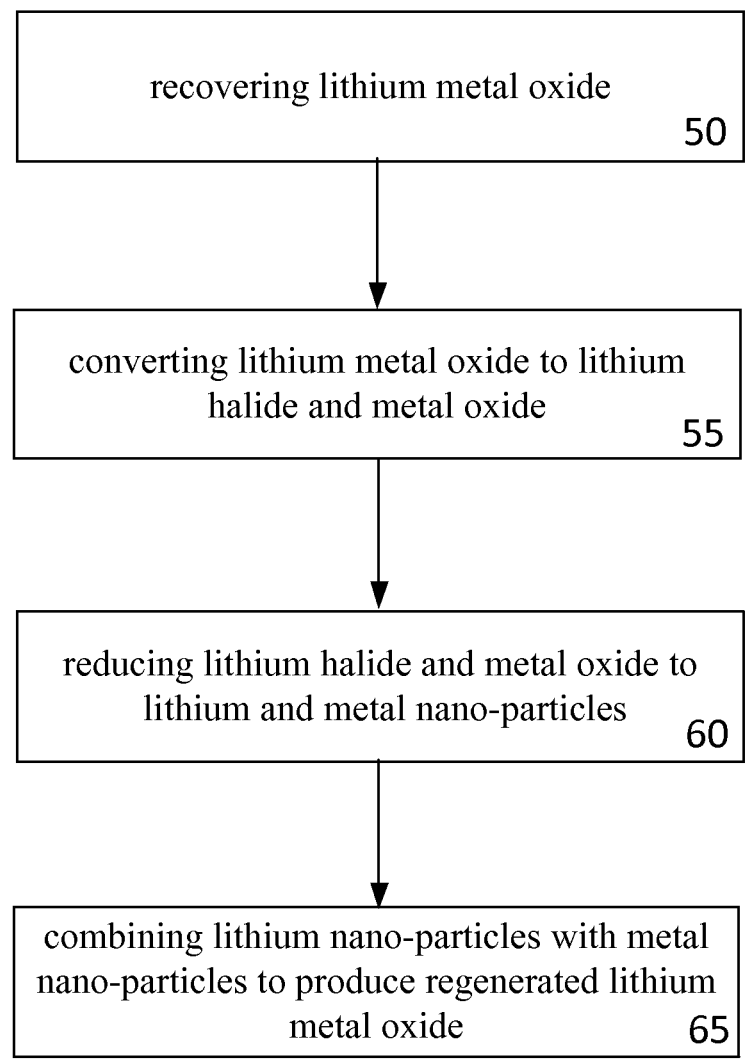
FIGS. 2A and 2B depict flow diagram representing methods for regenerating lithium metal oxides according to an embodiment.

The lithium containing cathode material may be recovered from a partially or fully depleted Li-ion battery, recycled, and regenerated for use in other batteries via a general process as set forth in FIG. 2A. The method may generally include recovering lithium metal oxide from lithium-ion batteries 50, converting at least a portion of the lithium metal oxide to lithium halide and a metal oxide 55, reducing the lithium halide and the metal oxide to respective nano-particles 60, and combining the lithium nano-particles with the metal nano-particles in the presence of oxygen to produce regenerated lithium metal oxide 65.

Figure 2B:
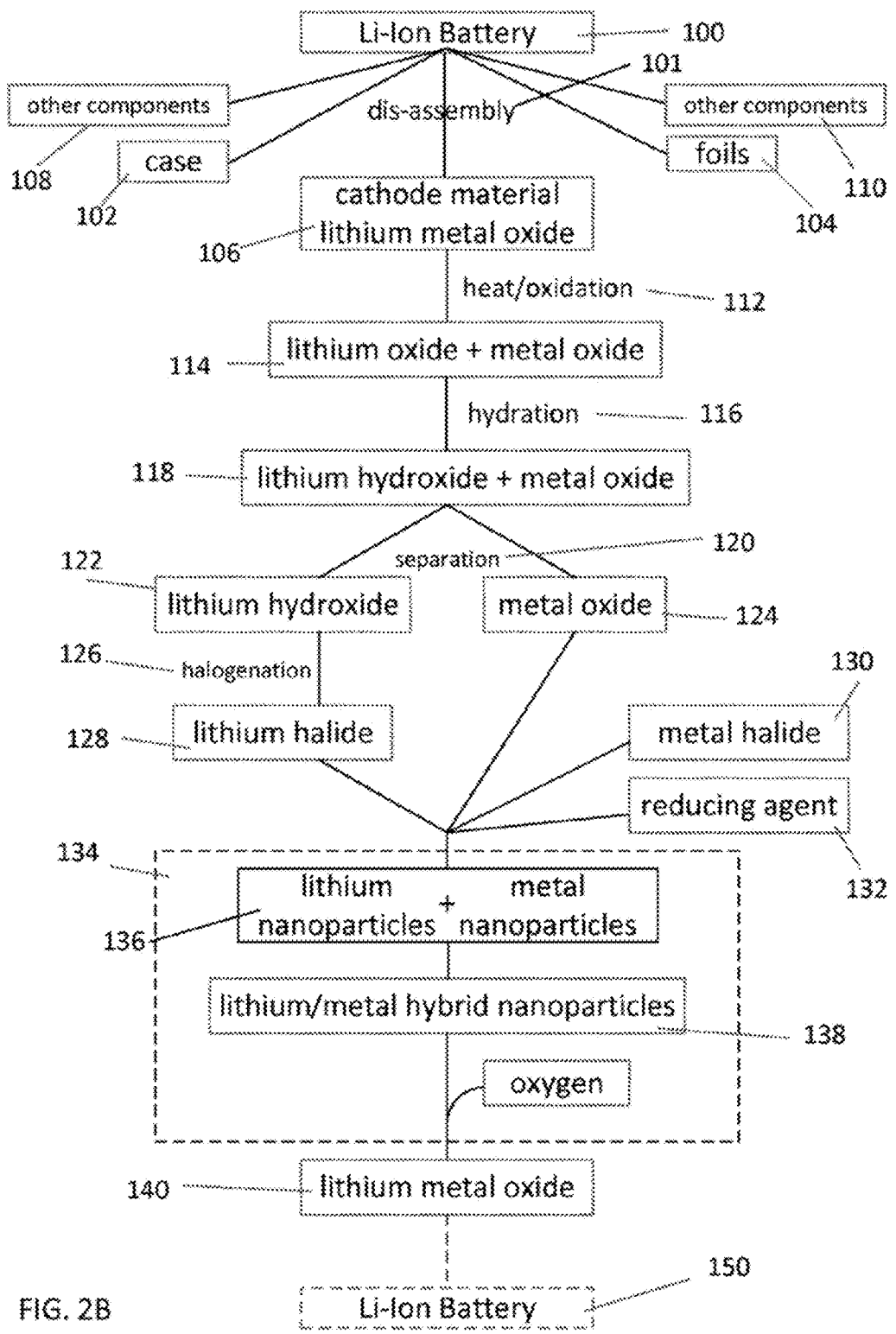

FIG. 2B provides a more detailed depiction for regenerating lithium metal oxides. As depicted in FIG. 2B, the method may include dis-assembling 101 partially or fully depleted Li-ion batteries 100 into various components that may include the case 102, foils 104, cathode material 106, and other components 108, 110. For example, the cathode material 106 may be scraped off of the cathode foil 104 with a scraper. For larger scale production, solvents, or other methods may be applied to remove the cathode materials 106 from the foils 104. In an embodiment, and as discussed above, the lithium metal oxide cathode material may be $LiCoO_2$.

After separation, the process may include drying, sieving, and powdering of the lithium metal oxide cathode material 106 into particles having a size of less than or equal to about 200 μm. Smaller particles sizes are desired to provide the greatest reactive surface area for processing. Heating 112 of the lithium metal oxide cathode material 106 may be done under oxidizing conditions to oxidize the lithium metal oxide cathode material resulting in a mixture 114 of lithium oxide and metal oxide. In an embodiment, the heating may be done at a temperature of about 200° C. to about 1000° C. for a period of time of about 10 minutes to about 2 hours in the presence of water or water and a binder solvent. Any binders in the cathode material 106 may vaporize during the heating 112.

For an embodiment with LiCoO$_2$ materials, a general reaction may be depicted as follows:

$$2LiCoO_2 = Li_2O + Co_2O_3.$$

The resultant oxide material may be finely powdered and may contain a mixture of lithium oxides (Li$_2$O) and metal oxides (CoO, Co$_2$O$_3$ and Co$_3$O$_4$).

Hydration 116 of the oxides in the mixture 114 may be done by placing the mixture 114 in distilled water with stirring for about 24 hours at ambient temperature to decompose the Li$_2$O to lithium hydroxide (LiOH), thereby resulting in a mixture 118 of metal oxides and lithium hydroxide. Alternatively, the mixture 114 may be heated with stirring to about 80° for about 10 to about 30 minutes, and then left with stirring for an additional 2-3 hours under ambient conditions. For an embodiment with LiCoO$_2$ materials, a general reaction may be depicted as follows:

$$Li_2O + H_2O + Co_2O_3 \rightarrow 2LiOH + Co_2O_3.$$

The LiOH is soluble in water, and the metal oxides may precipitate out. Separation 120 may be done to separate the lithium from the metal. The separation 120 may include decanting of the LiOH solution 122, and/or filtering the metal oxides 124 from the solution. The metal oxides 124 may be dried, powdered and washed. The extracted metal oxides 124 may also contain lithium hydroxide, carbon, and some polymer binder impurities, but these components seem to have minimal, if any, adverse effect on the regeneration process.

The process may include halogenation 126 of the LiOH 122 to produce lithium halide 128. The halogenation 126 may include adding an appropriate concentrated hydrohalic acid to the solution. Hydrohalic acids may include, hydrochloric (HCl), hydrofluoric (HF), hydrobromic (HBr) and hydroiodic (HI). Isolation of the lithium halide 128 may be done by evaporating the aqueous solution. For an embodiment, a general reaction may be depicted as follows:

$$LiOH + HCl \rightarrow LiCl + H_2O.$$

Regeneration of lithium metal oxide 140 may be done at ambient temperature and pressure by combining the metal oxides 124 and the lithium halide 128 together in the presence of a metal halide 130 and a reducing agent 132. This reaction may be carried out in an aqueous solution such as, for example, a 2:1 solution of ethanol and water. Examples of reducing agents may include, sodium borohydride (NaBH$_4$), hydrogen gas, carbon monoxide, lithium borohydride (LiBH$_4$), hydroquinone, hydrazine hydrate, calcium hydride, sodium hydride, N-dimethylformamide, sodium citrate, and combinations thereof. The resultant sequential reaction steps 134 may produce a mixture 136 of individual nanoparticles of lithium and individual nanoparticles of metal in a nanoparticle mixture 136. The nanoparticles of lithium and nanoparticles of metal may combine to form lithium/metal hybrid nanoparticles 138. The lithium/metal hybrid nanoparticles 138 are very unstable and may immediately combine with free oxygen in the mixture to form lithium metal oxide 140.

For an embodiment with lithium chloride and cobalt oxides, a general reaction sequence may be depicted as follows (NP=nanoparticles):

$$LiCl + Co(II,III)oxide + CoCl_2 \cdot 6H_2O + 2NaBH_4 \rightarrow LiNP + CoNP + 2NaCl + H_3BO_3 + 6H_2O + H_2$$

$$LiNP + CoNP + H_2 \rightarrow Li/CoNP(unstable)$$

which, in the presence of oxygen in the solution, may then proceed as follows:

$$Li/CoNP + O_2 \rightarrow LiCoO_2 + 2NaCl + H_3BO_3 + 6H_2O.$$

This reaction scheme may be expected since:

$$CoCl_2 \cdot 6H_2O + 2NaBH_4 \rightarrow CoNP + 2NaCl + H_3BO_3 + 6H_2O + H_2; \text{ and}$$

$$LiCl + NaBH_4 \rightarrow LiNP + NaCl + H_3BO_3 + 6H_2O + H_2.$$

This reaction sequence may be summarized by the following:

LiCl+cobalt oxide+CoCl$_2$.6H$_2$O+NaBH$_4$→LiCoO$_2$+ NaCl+H$_3$BO$_3$+H$_2$O+H$_2$, wherein the cobalt oxide may be cobalt(II) oxide (cobaltous oxide—CoO), cobalt(III) oxide (cobaltic oxide—Co$_2$O$_3$), cobalt(II,III) oxide—Co$_3$O$_4$).

In embodiments in which a high molarity reducing agent, such as NaBH$_4$, or excess of metal halide, such as CoCl$_2$.6H$_2$O is used or present, cobalt boride (Co$_2$B) may be produced. If Co$_2$B is in minute quantities, it may be removed from the surface of the material. To avoid Co$_2$B formation, some excess lithium halide (such as lithium chloride) may be added. This may be due to higher electro positivity of lithium than boron, thus making lithium more reactive. However, too much LiCl and very low molarity of NaBH$_4$ may result in the production of unstable LiCoO$_2$(precipitated), which may spontaneously convert to CoCl$_2$(soluble) within a few minutes due to presence of excess chlorine atoms in solution. Addition of more NaBH$_4$ may again convert CoCl$_2$ back to LiCoO$_2$.

Impurities like LiOH, carbon, and polymer binder in the extracted cobalt oxide material (from spent batteries) does not seem to have any adverse effect on the synthesis procedure and electrical performance of the regenerated material. Any residual LiOH may also be converted to LiCl, when LiCl(LiOH+HCl) is added to the solution.

In an embodiment, a method for regenerating a cathode material from a partially or fully depleted Li-ion battery, may include recovering lithium metal oxide from the Li-ion battery, converting at least a portion of the lithium metal oxide to lithium halide and a metal oxide, reducing the lithium halide and the metal oxide to respective nano-particles, and combining the lithium nano-particles with the metal nano-particles in the presence of oxygen to produce regenerated lithium metal oxide.

In an embodiment, after recovering the lithium metal oxide, the lithium metal oxide may be powdered to particles having an average size of equal to or less than about 200 micrometers. As mentioned above, the lithium metal oxide may be any lithium metal oxide represented by the formula Li$_x$MO$_y$, where M is one or more transition metals each having a stable formal oxidation state of +2 or +3, and (x+3−z)/2≤y≤(x+3+z)/2, where z is 0, 1 or 2. In an embodiment, the value of x may be 1, and M may be at least one of Mn, Co or Ni.

In an embodiment, the lithium nano-particles may be combined with the metal nano-particles in the presence of oxygen at ambient temperature and/or ambient pressure. The step of converting of at least a portion of the lithium metal oxide to lithium halide and the metal oxide may include oxidizing the lithium metal oxide to lithium oxide and the metal oxide, hydrating the lithium oxide to lithium hydroxide, and halogenating the lithium hydroxide to the lithium halide. Oxidation of the lithium metal oxide may include heating the lithium metal oxide under oxidizing conditions at a temperature and for a period of time sufficient for oxidizing the lithium metal oxide, and halogenation may include contacting the lithium hydroxide with a hydrohalic acid. The hydrohalic acid may be hydrochloric acid, hydrofluoric acid, hydrobromic acid, hydroiodic acid, or any combination thereof.

The step of reducing the lithium halide and the metal oxide to respective nano-particles may include reducing the lithium halide and metal oxide in the presence of metal halide to produce the nano-particles of lithium and the nano-particles of metal. This reduction may be performed in the presence of a reducing agent at a temperature and for a period of time sufficient for reducing the lithium halide the metal oxide and the metal halide. The reduction may include contacting the lithium halide, metal halide and metal oxide with hydrogen gas to reduce the lithium halide to lithium nanoparticles and reduce the metal halide and the metal oxide to metal nanoparticles, and the contacting with hydrogen gas may be performed at a pressure less than ambient atmospheric pressure.

In the above-discussed procedural steps, the metal of the metal oxide may be the same as the metal of the metal halide, and in an embodiment, the metal of the metal oxide and the metal halide may be Co, Mn or Ni.

In an embodiment wherein the lithium metal halide is $LiCoO_2$, a method for regenerating a cathode material from a partially or fully depleted Li-ion battery, may include recovering $LiCoO_2$ from the Li-ion battery. After recovery, at least a portion of the $LiCoO_2$ may be converted to lithium halide, CoO and $Co_3O_4$. In a subsequent reduction step, the lithium halide may be reduced to nanoparticle of lithium, the CoO and $Co_3O_4$ may be reduced to nano-particles of cobalt, and, in the presence of oxygen, the lithium nano-particles may combine with the cobalt nano-particles to produce regenerated $LiCoO_2$.

In an embodiment, the reduction step may include reducing the lithium halide, CoO, and $Co_3O_4$ in the presence of cobalt halide to produce the nanoparticle of lithium and the nanoparticles of cobalt. The reduction may be performed in the presence of a reducing agent. Examples of reducing agents are discussed above. In an embodiment wherein the lithium halide may be lithium chloride, the reduction may include reducing the LiCl, CoO and $Co_3O_4$ in the presence of $CoCl_2.6H_2O$ and $NaBH_4$.

The regenerated lithium metal oxide from the above procedures may be used for producing a Li-ion battery. In a manner as discussed above, with reference to FIG. 1, a metal foil may be coated with the regenerated material, and the coated metal foil may be layered with a separator sheet and an anode sheet to produce a stacked electrode structure. The stacked electrode structure may be contacted with an electrolyte solution to produce a Li-ion battery.

The particle size of the regenerated lithium metal oxide may be reduced to an average size equal to or less than about 200 μm to achieve the maximum effective surface area of the electrodes. The reduced particle size lithium metal oxide may be mixed with a conducting material, such as carbon black or another conducting material as described above, and a binder, such as PEG or another binder as discussed above, to form a lithium metal oxide paste for coating the foil.

In an embodiment, the paste may be applied to both sides of the foil, either one side at a time with a corresponding drying to deposit the lithium metal oxide paste onto the foil, or essentially simultaneously with a single drying step.

In view of the above procedural steps, a general method for producing lithium metal oxides may include forming a mixture of at least one lithium halide and at least one metal oxide, reducing the lithium halide and the metal oxide to respective nano-particles, and combining the lithium nano-particles with the metal nano-particles in the presence of oxygen to produce regenerated lithium metal oxide.

The reduction of the lithium halide and metal oxide to respective nano-particles may include reducing the lithium halide and metal oxide in the presence of at least one metal halide to produce the nano-particles of lithium and the nano-particles of metal. This reduction may include contacting the lithium halide, the metal halide and the metal oxide with a reducing agent at a temperature and for a period of time sufficient for reducing the lithium halide to lithium nanoparticles and reducing the metal halide and the metal oxide to metal nanoparticles. Examples of reducing agents are provided herein.

In an embodiment, the metal of the metal oxide may be the same as the metal of the metal halide, and may be at least one of Co, Mn or Ni. As set forth herein, the at least one lithium halide and the at least one metal oxide may be obtained from a partially or fully depleted Li-ion battery by a method that includes recovering lithium metal oxide from the Li-ion battery, and converting the lithium metal oxide to lithium halide and a metal oxide.

Example 1: Recovery of Cathode Materials from Li-Ion Batteries

Li-ion batteries were dis-assembled and the various different components were separated. The foils having the $LiCoO_2$ pasted thereon were scraped with a non-metallic scraper to remove the $LiCoO_2$. The $LiCoO_2$ was dried, sieved and ground to a fine powder of particles having an average size of less than or equal to about 200 μm.

The $LiCoO_2$ was moderately heated to a temperature of about 400° C. for about 1 hour at ambient pressure and under oxidizing conditions to vaporize any binders and oxidize the $LiCoO_2$ to lithium oxide ($Li_2O$) and cobalt oxides (CoO, $Co_2O_3$ and $Co_3O_4$). This mixture of oxides was then hydrated by placing the mixture in distilled water with stirring for about 24 hours. The hydration decomposed the $Li_2O$ to LiOH that is soluble in water, while the cobalt oxides precipitated out. The LiOH solution was decanted. The cobalt oxides were dried, powdered and washed four times. The LiOH in solution was converted to LiCl by adding concentrated hydrochloric acid to the solution. The LiCl was then isolated by evaporating the aqueous solution.

Example 2: Producing Lithium Metal Oxides

Cobalt(II & III) oxides (CoO, $Co_3O_4$) and LiCl, such as those recovered in Example 1, were used to produce $LiCoO_2$. A 2:1 ethanol water solution was prepared, and 2.2 g of 1M $CoCl_2.6H_2O$ was dissolved in the solution, producing a pink colored solution. To this pink solution was added 11 g of powdered cobalt oxide, and the color changed to blue-violet to violet black. While stirring, 6.12 ml of 10M LiCl were added, and the color changed to dark green. This resultant solution had approximately a 1:1:2 ratio of cobalt oxides:$CoCl_2.6H_2O$:LiCl so that the lithium to cobalt ratio was about 1:1. About 25 ml of the reducing agent 1M NaBH$_4$ was added drop-wise with vigorous stirring, wherein the color changed to grey, then dark grey, and finally black, indicative that LiCoO$_2$ had been synthesized.

When NaBH$_4$ was added drop wise to reduce CoCl$_2$6H$_2$O and cobalt oxide to produce cobalt nanoparticles, LiCl was also simultaneously reduced to lithium nanoparticles. Immediately after the formation of the Co and Li nanoparticles, the Co and Li nanoparticles combined to form lithium and cobalt hybrid nanoparticles (LiCo). Since lithium and cobalt hybrid nanoparticles are extremely unstable, the nanoparticles were immediately oxidized by dissolved oxygen in the aqueous medium to produce LiCoO$_2$.

Figure 3A:
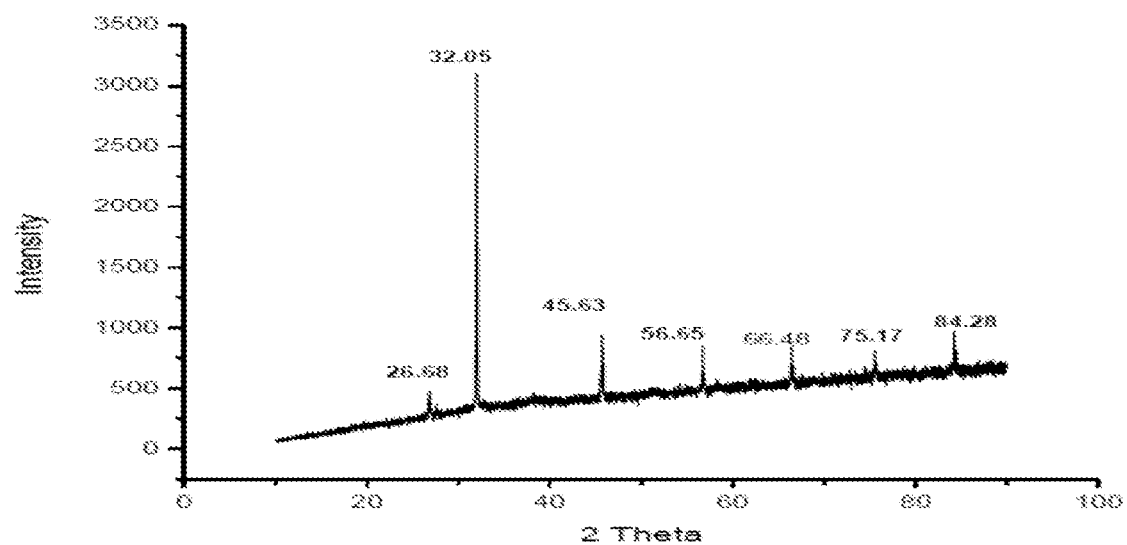
FIGS. 3A and 3B show comparative x-ray diffraction scans for $LiCoO_2$ regenerated according to an embodiment.
Figure 3B:
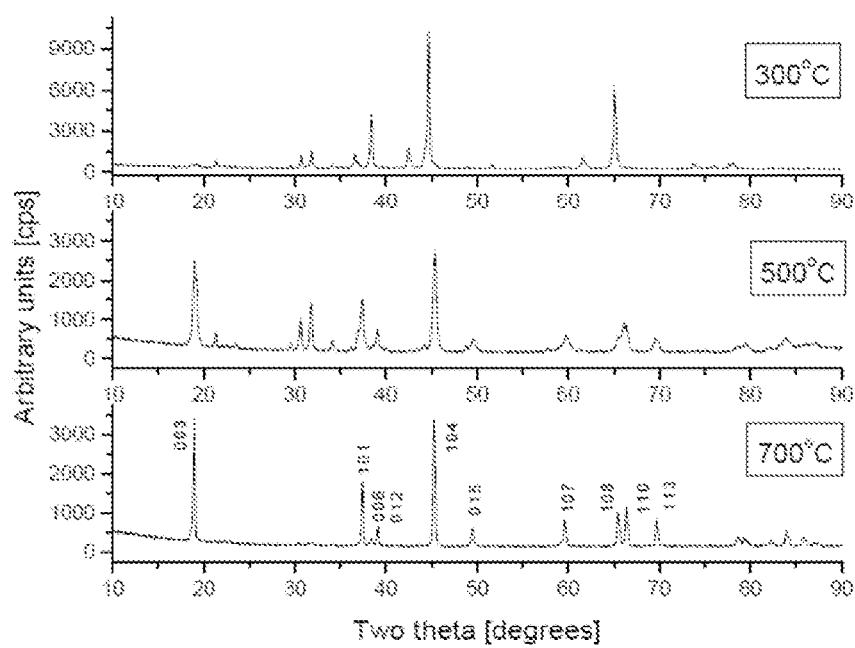

The synthesized LiCoO$_2$ material was allowed to precipitate, and the aqueous solution, containing dissolved NaCl and H$_3$BO$_3$ by-products, was separated by decantation. The regenerated LiCoO$_2$ was dried in a dry air oven for about 48 hours at about 60° C. FIGS. 3A and 3B respectively show High-Resolution X-Ray Diffraction (XRD) scans of regenerated LiCoO$_2$ in comparison with LiCoO$_2$ produced by other methods. The generated scan of FIG. 3A was compared with the XRD database using PcPdfWin software, that matched the scan in FIG. 3A with that of FIG. 3B, showing a significant match. The higher peaks in FIG. 3A indicate that the LiCoO$_2$ produced by the described process may have mild magnetic properties, which is possible since the entire synthesis is performed in ambient conditions.

Figure 4A:
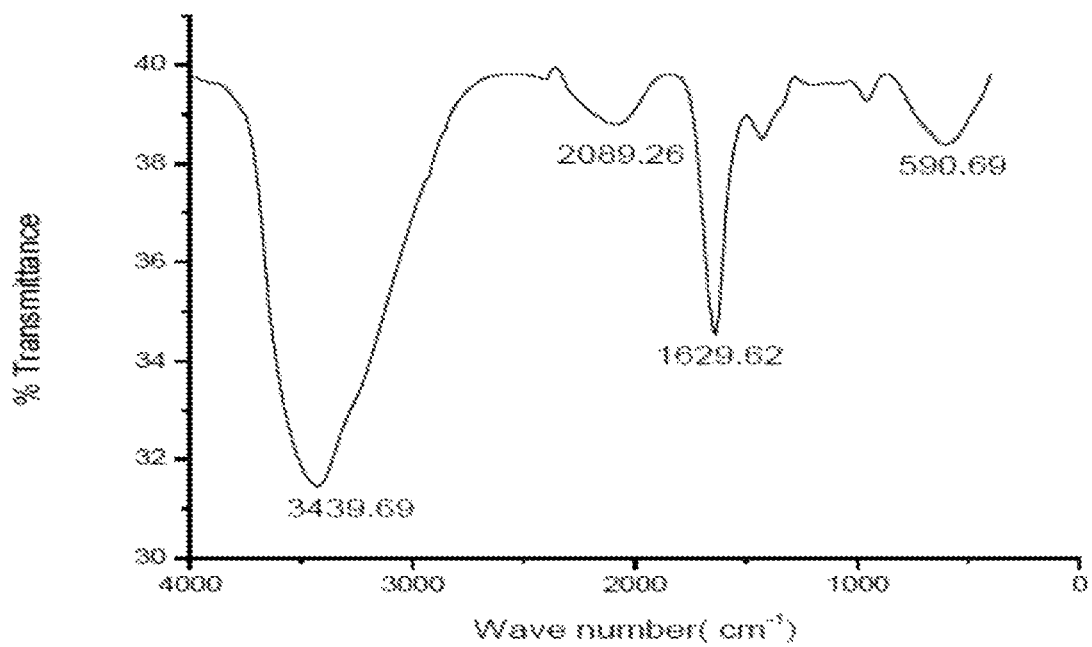
FIGS. 4A and 4B show comparative FTIR scans for $LiCoO_2$ regenerated according to an embodiment.
Figure 4B:
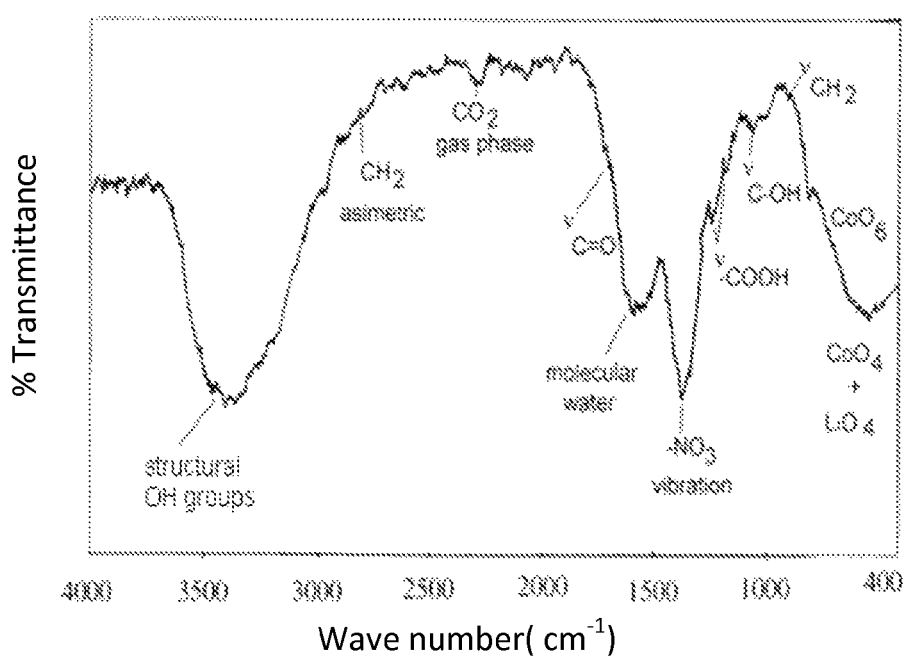

FIGS. 4A and 4B respectively show Fourier-Transform Infra-Red (FTIR) scans of the regenerated LiCoO$_2$ in comparison with LiCoO$_2$ produced by other methods. The 'major' similar peaks may be seen in both scans. Any variations between the scans of FIGS. 4A and 4B may possibly be due to variations in the proportion of lithium, cobalt and oxygen that may result from the synthesis time or the time of addition of the reducing agent.

Figure 5A:
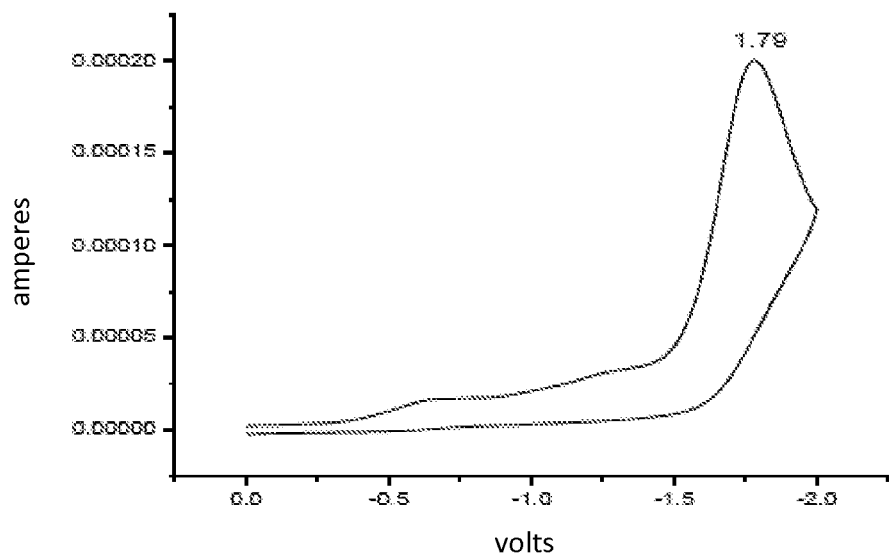
FIGS. 5A-5D show voltammetry scans for $LiCoO_2$ regenerated according to an embodiment.
Figure 5B:
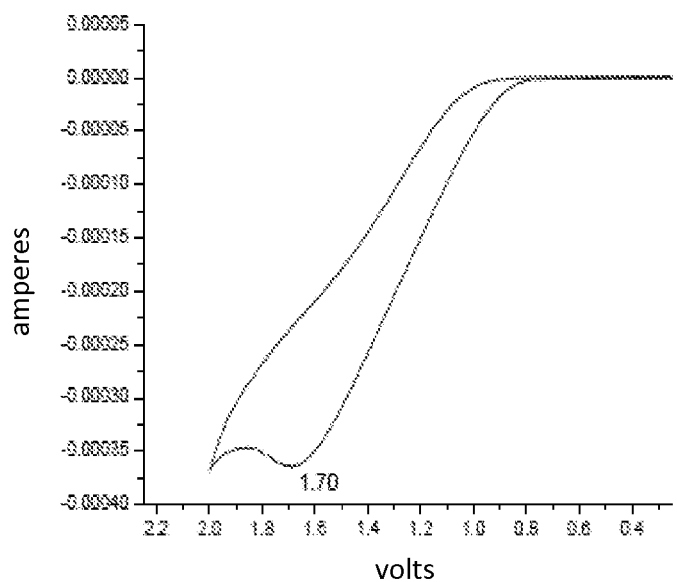
Figure 5C:
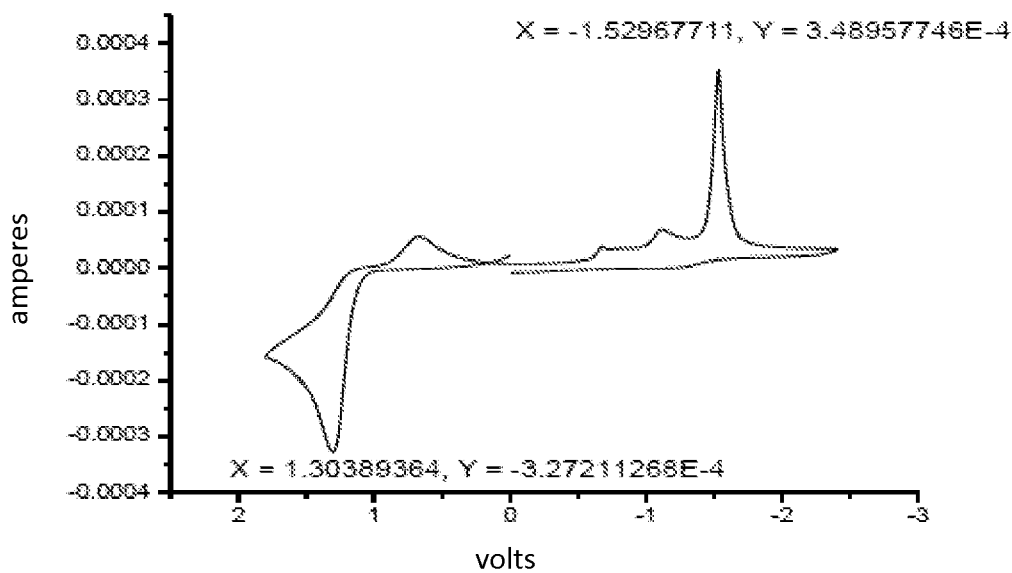
Figure 5D:
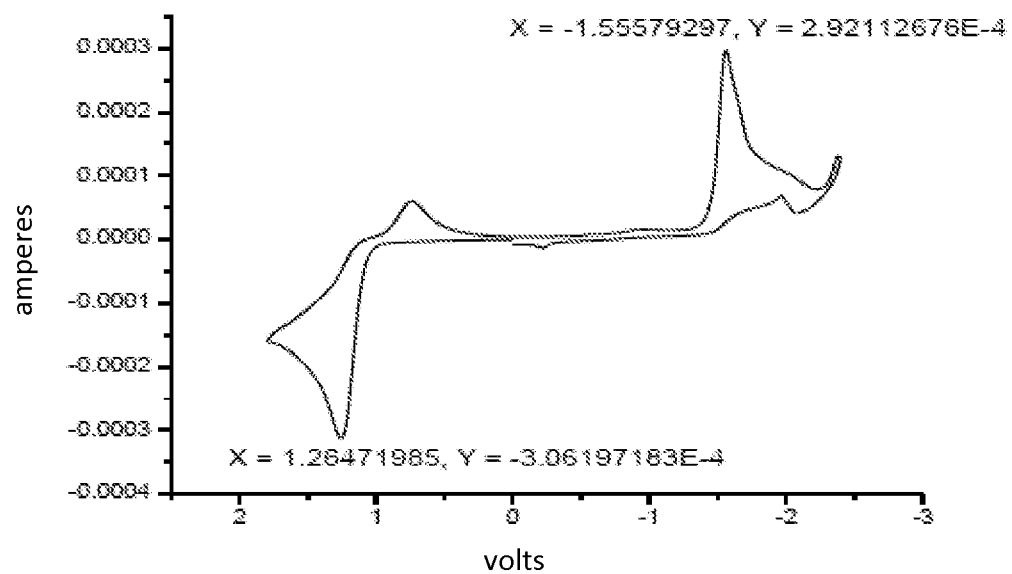

FIGS. 5A-5D show voltammetry scans of the regenerated LiCoO$_2$, essentially indicating its usefulness for rechargeable batteries. Cyclic voltammograms (CV) show the oxidation and reduction peaks of a material to provide an indicator of the electrochemical properties of the material. Since LiCoO$_2$ is poorly soluble in DMSO, the oxidation or reduction peaks in DMSO were only obtainable in separate scans (FIGS. 5A and 5B). With acetonitrile as the solvent, full loop oxidation and reduction scans of LiCoO$_2$ were attained (FIGS. 5C and 5D). The shape of CV curves may be used to deduce the electrochemical processes involved in the charging and discharging a storage device, such as the LiCoO$_2$ materials. The current initially increases when charging from zero potential, and then decreases upon further increase in the electric potential. Thus, a peak is observed in the CV. The reasons for the peak in CV curves may be attributed to several factors, including: the "electrolyte starvation" due to limited amount of ions at low concentrations; redox reactions at the electrode surface as well as the "difference of diffusion capability between solvated anions and cations in the electrolyte"; and the "available active surface becoming fully saturated with ions" before reaching the maximum potential (this current decreases, even with increasing voltage).

Example 3: Use of Regenerated LiCoO$_2$ in a Lithium-Ion Battery

The dried, regenerated LiCoO$_2$ of Example 2 was mixed with PEG binder and carbon black in NMP solvent to produce a slurry for the cathode material for a Li-ion battery. The 'cathode' slurry was coated on a first side of an aluminum foil having a thickness of about 20 µm, and dried at a temperature from about 80° C. to 100° C. The same procedure was then repeated on the second side of the foil. The coated foil was compression molded by a roll press, and cut into an elongated strip to form a cathode plate.

An anode plate was prepared using a similar procedure. Carbon black was mixed with PEG binder in PVDF solvent to form a slurry for the anode material for a Li-ion battery. The 'anode' slurry was coated on a first side of a copper foil having a thickness of about 20 µm, and dried at a temperature from about 80° C. to 100° C. The same procedure was then repeated on the second side of the foil. The coated foil was compression molded by a roll press, and cut into an elongated strip to form an anode plate.

A finely porous polyethylene (PE) film having a thickness of about 25 µm was used as a separator sheet. Cathode and anode strips were attached to the respective plates. The anode plate was laid flat and covered by a first separator sheet. The cathode plate was placed on the first separator sheet and a second separator sheet was placed over the cathode plate. The assembled sheets were rolled from one end to produce a cylindrical cell.

The cylindrical cell was placed in a sealable container, leaving the cathode and anode protruding therefrom, and the container was then filled with an electrolyte solution of LiPF$_6$, in ethylene carbonate (EC). The container was then sealed to provide a Li-ion rechargeable battery.

Example 4: A Li-Ion Battery with Regenerated LiCoO$_2$ (1:1)

LiCoO$_2$ (1:1) was synthesized from cobalt oxide (spent batteries):cobalt chloride in 1:1 ratio. A 5 cm diameter plastic, lidded container was used to make a rechargeable battery with a slurry of regenerated dried LiCoO$_2$ (1:1), carbon powder and polyethylene glycol as cathode. A separator was obtained from a Li-ion mobile battery after dismantling of the battery and careful removal of the separator. The separator was cut to accurate size and shape to fit in the plastic container. The separator was placed over the regenerated LiCoO$_2$ and carbon cathode material. Activated carbon and polyethylene glycol was used as the anode, which was fitted in the lid of the box. The lid was placed on the box with the anode then positioned above the separator already fitted above the cathode in the box bottom. Electrolyte materials were added and the lid was closed. The battery was charged and discharged for more than 100 times during a period of 15 days. The battery showed up to about 3.9 volt open circuit discharge, whereas a continuous discharge of about 2.4-2.8 volts was observed.

Example 5: A Li-Ion Battery with Regenerated LiCoO$_2$ (5:1)

LiCoO$_2$ (5:1) was synthesized from cobalt oxide (spent batteries):cobalt chloride in 5:1 ratio. A 5 cm diameter plastic, lidded container was used to make rechargeable battery with a slurry of regenerated dried LiCoO$_2$ (5:1), carbon powder and polyethylene glycol as cathode. A separator was obtained from a Li-ion mobile battery after dismantling of the battery and careful removal of the separator. The separator was cut to accurate size and shape to fit in the plastic weight box. The separator was placed over the regenerated LiCoO$_2$ and carbon cathode material. Activated carbon and polyethylene glycol was used as the anode, which was fitted in the lid of the box. The lid was placed on the box with the anode then positioned above the separator already fitted above the cathode in the box bottom. Electrolyte materials were added and the lid was closed. The battery was charged (about 2-4 hours) and provided up to about 3.7 volt open circuit discharge, whereas a continuous discharge of about 2.4-2.8 volts was observed.

Example 6: A Li-Ion Pouch Battery with Regenerated $LiCoO_2$ (5:1)

A pouch cell (about 4 cm×4 cm) was made using regenerated $LiCoO_2$ mixed with carbon and polyethylene glycol as cathode material. Only carbon powder mixed with polyethylene glycol was used as the anode. Two long strips of aluminum foil (about 30 cm×8 cm) were cut, and cathode and anode slurries were pasted on both sides of the foils. Both of the cathode and anode material pasted aluminum foils were dried on an electric heater. A separator membrane was obtained from a Li-ion mobile battery. Two separators were placed carefully on both sides of the cathode strip to prevent direct contact between the anode and cathode, and the assembly was folded together. Two connectors were inserted, one to each of the cathode part and the anode part of the cell. The cell was covered tightly by cello tape. This rechargeable pouch cell was charged by a mobile charger, and discharged up to about 2.9 volts.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for regenerating a cathode material from a partially or fully depleted lithium-ion battery, the method comprising:
    recovering lithium metal oxide from the lithium-ion battery;
    converting at least a portion of the lithium metal oxide to lithium halide and a metal oxide;
    reducing the lithium halide and the metal oxide to respective lithium nanoparticles and metal nanoparticles; and
    combining the lithium nanoparticles with the metal nanoparticles in the presence of oxygen to produce regenerated lithium metal oxide.

2. The method of claim 1, wherein the metal of the metal oxide is at least one metal selected from the group consisting of Mn, Co and Ni.

3. The method of claim 1, wherein the lithium metal oxide is $LiCoO_2$.

4. The method of claim 1, wherein the combining is performed at ambient temperature and under ambient atmospheric pressure.

5. The method of claim 1, wherein the converting of at least a portion of the lithium metal oxide to lithium halide and the metal oxide comprises:
    oxidizing the lithium metal oxide to the lithium oxide and the metal oxide;
    hydrating the lithium oxide to lithium hydroxide; and
    halogenating the lithium hydroxide to the lithium halide.

6. The method of claim 5, wherein:
    the oxidizing comprises heating the lithium metal oxide under oxidizing conditions at a temperature and for a period of time sufficient for oxidizing the lithium metal oxide; and
    the halogenating comprises contacting the lithium hydroxide with a hydrohalic acid.

7. The method of claim 1, wherein the reducing of the lithium halide and the metal oxide to respective nanoparticles comprises reducing the lithium halide and the metal oxide in the presence of metal halide to produce the nanoparticles of lithium and the nanoparticles of metal.

8. The method of claim 7, wherein:
    the reducing comprises contacting the lithium halide, the metal halide and the metal oxide with hydrogen gas at a temperature and for a period of time sufficient for reducing the lithium halide to the lithium nanoparticles and reducing the metal oxide and the metal halide to metal nanoparticles.

9. The method of claim 8, wherein the contacting with the hydrogen gas is performed at a pressure less than ambient atmospheric pressure.

10. The method of claim 8, wherein the metal of the metal oxide and the metal halide is Co, Mn or Ni.

11. The method of claim 1, wherein:
    the lithium metal oxide comprises $LiCoO_2$;
    the converting comprises converting at least a portion of the $LiCoO_2$ to the lithium halide, CoO and $Co_3O_4$;
    the reducing comprises reducing the lithium halide, CoO, and $Co_3O_4$ in the presence of cobalt halide and a reducing agent to reduce the lithium halide to nanoparticle of lithium and reduce the CoO and $Co_3O_4$ to nanoparticles of cobalt; and
    the reducing is performed in the presence of oxygen to combine the nanoparticle of lithium with the nanoparticles of cobalt to produce regenerated $LiCoO_2$.

12. The method of claim 11, wherein:
    the method further comprises powdering the $LiCoO_2$ to an average particle size of equal to or less than about 200 micrometers after recovering the $LiCoO_2$ from the lithium-ion battery;
    the lithium halide is lithium chloride;
    the reducing agent is $NaBH_4$; and
    the reducing comprises reducing the LiCl, CoO and $Co_3O_4$ in the presence of $CoCl_2.6H_2O$ and $NaBH_4$.

13. A method for regenerating and reusing cathode material from a partially or fully depleted lithium-ion battery, the method comprising:
    recovering lithium metal oxide from the battery;
    converting at least a portion of the lithium metal oxide to lithium halide and a metal oxide;
    reducing the lithium halide and the metal oxide to respective lithium nanoparticles and metal nanoparticles;
    combining the lithium nanoparticles with the metal nanoparticles in the presence of oxygen to produce regenerated lithium metal oxide;
    coating a metal foil with the regenerated lithium metal oxide;
    layering the coated metal foil, separator sheets, and an anode sheet to produce a stacked electrode structure; and
    contacting the stacked electrode structure with an electrolyte solution to produce the lithium-ion battery.

14. The method of claim 13, wherein coating the metal foil further comprises:
    reducing the particle size of the regenerated lithium metal oxide to an average size equal to or less than about 200 nm;
    mixing the reduced particle size lithium metal oxide with carbon black and a binder to form a lithium metal oxide paste for coating the foil;

applying a layer of the lithium metal oxide paste to both sides of the foil; and drying the foil.

15. The method of claim 13, wherein the metal of the metal oxide is at least one metal selected from the group consisting of Mn, Co and Ni.

16. The method of claim 13, wherein converting at least a portion of the lithium metal oxide to the lithium halide and the metal oxide comprises:

heating the lithium metal oxide under oxidizing conditions at a temperature and for a period of time sufficient for oxidizing the lithium metal oxide to the lithium oxide and the metal oxide;

hydrating the lithium oxide to lithium hydroxide; and contacting the lithium hydroxide with at least one of hydrochloric acid, hydrofluoric acid, hydrobromic acid, and hydroiodic acid to halogenate the lithium hydroxide to the lithium halide.

17. The method of claim 13, wherein reducing the lithium halide and the metal oxide to particles of lithium and particles of metal comprises reducing the lithium halide and the metal oxide in the presence of metal halide and a reducing agent at a temperature and for a period of time sufficient for reducing the lithium halide, the metal halide, and the metal oxide to produce the particles of lithium and the particles of metal.

18. The method of claim 13, wherein:

the lithium metal oxide is $LiCoO_2$;

the converting comprises converting at least a portion of the $LiCoO_2$ to the lithium halide, CoO, and $Co_3O_4$ by the steps of:

oxidizing the $LiCoO_2$ to $Li_2O$, CoO and $Co_3O_4$;

hydrating the $Li_2O$ to LiOH; and halogenating the LiOH to the lithium halide by contacting the LiOH with a hydrohalic acid;

the reducing comprises reducing the lithium halide to nanoparticles of lithium and reducing the CoO and $Co_3O_4$ to nanoparticles of cobalt; and the reducing is performed in the presence of oxygen to combine the nanoparticles of lithium, the nanoparticles of cobalt, and the oxygen to produce $LiCoO_2$.

19. The method of claim 18, wherein:

the hydrohalic acid is HCl;

the lithium halide is LiCl;

the reducing comprises reducing the lithium halide, CoO, and $Co_3O_4$ in the presence of $CoCl_2 6H_2O$ and a reducing agent selected from carbon monoxide, hydrogen gas, sodium borohydride, lithium borohydride, hydroquinone, hydrazine hydrate, calcium hydride, sodium hydride, N-dimethylformamide, sodium citrate, or a combination thereof.

20. The method of claim 13, wherein the lithium metal oxide is $LiCoO_2$.

* * * * *